United States Patent
Hrusch

(10) Patent No.: US 11,519,342 B2
(45) Date of Patent: Dec. 6, 2022

(54) CRANKTRAIN PHASE ADJUSTER FOR VARIABLE COMPRESSION RATIO

(71) Applicant: Schaeffler Technologies AG & Co. KG, Herzogenaurach (DE)

(72) Inventor: Nicholas Hrusch, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 17/666,825

(22) Filed: Feb. 8, 2022

(65) Prior Publication Data

US 2022/0252015 A1 Aug. 11, 2022

Related U.S. Application Data

(60) Provisional application No. 63/148,548, filed on Feb. 11, 2021.

(51) Int. Cl.
*F02D 15/04* (2006.01)
*F16C 17/04* (2006.01)
*F02D 15/02* (2006.01)
*F02B 75/04* (2006.01)
(Continued)

(52) U.S. Cl.
CPC ............ *F02D 15/04* (2013.01); *F02B 75/047* (2013.01); *F02D 15/02* (2013.01); *F16C 17/04* (2013.01); *F16D 3/10* (2013.01); *F16H 35/008* (2013.01)

(58) Field of Classification Search
None
See application file for complete search history.

(56) References Cited

U.S. PATENT DOCUMENTS 4,876,992 A * 10/1989 Sobotowski .......... F02B 75/225
  123/59.6
4,922,790 A *  5/1990 Abbott .................... F16H 1/46
  475/341

(Continued)

FOREIGN PATENT DOCUMENTS

CA  2910872 A1 * 11/2014 ............ F02B 75/047
CA  2965182 A1 * 11/2014 ............ F02B 75/047
(Continued)

OTHER PUBLICATIONS

U.S. Appl. No. 17/498,316, filed Oct. 11, 2021 (unpublished).
U.S. Appl. No. 17/493,224, filed Oct. 4, 2021 (unpublished).

*Primary Examiner* — Kevin R Steckbauer
(74) *Attorney, Agent, or Firm* — Volpe Koenig

(57) ABSTRACT

A phase adjuster assembly is disclosed that includes an input gear connected to an input shaft via an interface assembly configured to provide both axial movement and rotational locking between the input gear and the input shaft. A piston plate is connected to the input shaft, and the piston plate defines at least one inner spiral bidirectional raceway. An output gear is configured to be driven by the input shaft, and the output gear at least partially defines at least one outer spiral bidirectional raceway. At least one first rolling element is arranged between the at least one inner bidirectional raceway and the at least one outer spiral bidirectional raceway. Axial movement of the piston plate adjusts a phase between the input gear and the output gear. The input shaft is configured to be axially displaced via axial movement of the piston plate.

20 Claims, 12 Drawing Sheets

(51) Int. Cl.
*F16H 35/00* (2006.01)
*F16D 3/10* (2006.01)

(56) References Cited

U.S. PATENT DOCUMENTS

| | | | | |
|---|---|---|---|---|
| 5,123,300 | A * | 6/1992 | Himmelein | H02K 51/00 74/395 |
| 6,386,166 | B1 * | 5/2002 | Scott | F01L 1/34403 123/90.37 |
| 6,386,167 | B1 * | 5/2002 | Urckfitz | F01L 1/344 123/90.37 |
| 6,405,696 | B1 * | 6/2002 | Borraccia | F01L 1/34406 123/90.37 |
| 6,505,582 | B2 * | 1/2003 | Moteki | F02B 75/048 123/48 B |
| 6,763,787 | B2 * | 7/2004 | Hallenstvedt | F16D 3/10 123/78 D |
| 7,421,990 | B2 * | 9/2008 | Taye | F01L 1/344 123/90.15 |
| 7,730,856 | B2 * | 6/2010 | Van Avermaete | F02D 15/04 123/48 B |
| 8,516,983 | B2 * | 8/2013 | David | F01L 1/344 123/90.15 |
| 8,584,633 | B2 * | 11/2013 | David | F01L 1/352 123/90.17 |
| 8,997,700 | B2 * | 4/2015 | Van Avermaete | F01M 11/02 123/196 R |
| 9,200,564 | B2 * | 12/2015 | Blackstock | F02B 75/047 |
| 9,482,161 | B2 * | 11/2016 | Nagai | F02B 75/048 |
| 9,534,513 | B2 * | 1/2017 | David | F01L 1/022 |
| 9,797,307 | B2 * | 10/2017 | Onigata | F02B 75/045 |
| 9,822,701 | B2 * | 11/2017 | Blackstock | F02B 75/047 |
| 9,890,638 | B2 * | 2/2018 | Baker, Jr. | F01B 21/02 |
| 10,138,944 | B2 * | 11/2018 | Brown | F01L 1/352 |
| 10,287,972 | B2 * | 5/2019 | Nagai | F02B 75/32 |
| 10,385,985 | B2 * | 8/2019 | Miyachi | F16K 31/043 |
| 10,514,109 | B2 * | 12/2019 | Miyachi | F01L 1/344 |
| 10,619,578 | B2 * | 4/2020 | Nagai | F02B 75/048 |
| 10,876,473 | B2 * | 12/2020 | Gilges | F16B 33/004 |
| 10,883,421 | B2 * | 1/2021 | Onigata | F02B 75/045 |
| 11,280,263 | B2 * | 3/2022 | Heinbuch | F02B 75/047 |
| 2003/0111028 | A1 * | 6/2003 | Hallenstvedt | F02D 15/04 123/52.4 |
| 2003/0226534 | A1 * | 12/2003 | Watanabe | H02K 49/108 123/90.15 |
| 2008/0047511 | A1 * | 2/2008 | Taye | F01L 1/352 123/90.15 |
| 2008/0163836 | A1 * | 7/2008 | Taye | F16D 1/12 123/90.15 |
| 2009/0020103 | A1 * | 1/2009 | Van Avermaete | F02B 75/225 123/48 D |
| 2011/0030631 | A1 * | 2/2011 | David | F01L 1/344 464/160 |
| 2013/0081587 | A1 * | 4/2013 | David | F01L 1/344 123/90.17 |
| 2014/0326219 | A1 * | 11/2014 | Blackstock | F02B 75/047 123/48 B |
| 2015/0033906 | A1 * | 2/2015 | Kimus | F16H 35/008 74/568 R |
| 2015/0219009 | A1 * | 8/2015 | Onigata | F02D 15/02 74/586 |
| 2015/0219022 | A1 * | 8/2015 | Nagai | F02B 75/045 123/48 B |
| 2015/0354415 | A1 * | 12/2015 | David | F01L 1/344 123/90.17 |
| 2016/0047301 | A1 * | 2/2016 | Blackstock | F02B 75/047 123/48 B |
| 2016/0168995 | A1 * | 6/2016 | Baker, Jr. | F04B 9/02 92/61 |
| 2017/0198755 | A1 * | 7/2017 | Brown | F16D 3/10 |
| 2017/0254260 | A1 * | 9/2017 | Yamada | F02B 75/045 |
| 2017/0284291 | A1 * | 10/2017 | Zahdeh | F02B 75/045 |
| 2018/0016972 | A1 * | 1/2018 | Nagai | F16H 1/32 |
| 2018/0016975 | A1 * | 1/2018 | Onigata | F02B 75/045 |
| 2018/0073655 | A1 * | 3/2018 | Miyachi | F16K 31/043 |
| 2018/0073656 | A1 * | 3/2018 | Miyachi | F01L 1/352 |
| 2018/0223729 | A1 * | 8/2018 | Gilges | F02B 75/04 |
| 2018/0223730 | A1 * | 8/2018 | Suda | F02B 75/04 |
| 2018/0274437 | A1 * | 9/2018 | Shoji | F02D 15/02 |
| 2019/0072044 | A1 * | 3/2019 | Nagai | F16H 49/001 |
| 2019/0186311 | A1 * | 6/2019 | Nagai | F16H 1/32 |
| 2021/0340904 | A1 * | 11/2021 | Heinbuch | F02B 75/045 |
| 2021/0363917 | A1 * | 11/2021 | Hrusch | F02D 15/00 |
| 2021/0396161 | A1 * | 12/2021 | Sturgin | F01L 1/022 |
| 2021/0396174 | A1 * | 12/2021 | Hrusch | F01L 1/34403 |
| 2022/0049759 | A1 * | 2/2022 | Van Weelden | F16H 35/008 |
| 2022/0106916 | A1 * | 4/2022 | Hrusch | F02B 75/047 |
| 2022/0107013 | A1 * | 4/2022 | Sanekata | F01L 1/022 |
| 2022/0112848 | A1 * | 4/2022 | Hrusch | F02D 15/00 |

FOREIGN PATENT DOCUMENTS

| | | | | |
|---|---|---|---|---|
| CA | 2965182 | C * | 12/2018 | F02B 75/047 |
| CN | 86107594 | A * | 9/1987 | F01L 1/352 |
| CN | 105042001 | A * | 11/2015 | F16D 23/025 |
| CN | 107208550 | A * | 9/2017 | F01B 31/14 |
| CN | 107829793 | A * | 3/2018 | F01L 1/344 |
| CN | 107923316 | A * | 4/2018 | F01B 31/14 |
| CN | 108291483 | A * | 7/2018 | F02B 75/04 |
| CN | 105042001 | B * | 9/2018 | F16D 23/025 |
| CN | 106460657 | B * | 6/2019 | F02B 75/048 |
| CN | 107208550 | B * | 9/2019 | F01B 31/14 |
| CN | 110513169 | A * | 11/2019 | F01L 1/047 |
| CN | 113586259 | A * | 11/2021 | F01L 1/3442 |
| CN | 114076028 | A * | 2/2022 | F16H 35/008 |
| DE | 102004019190 | A1 * | 11/2005 | F01L 1/022 |
| DE | 60122142 | T2 * | 6/2007 | F02D 15/04 |
| DE | 102011120162 | A1 * | 6/2013 | F02B 75/047 |
| DE | 102015201804 | A1 * | 8/2015 | F02B 75/045 |
| DE | 102015201807 | A1 * | 8/2015 | F02B 75/045 |
| DE | 112015002170 | T5 * | 1/2017 | F01L 1/352 |
| DE | 112016000475 | T5 * | 10/2017 | F01B 31/14 |
| DE | 102021106921 | A1 * | 11/2021 | F01L 1/3442 |
| EP | 1292762 | B1 * | 8/2006 | F02D 15/04 |
| EP | 1895114 | A1 * | 3/2008 | F01L 1/344 |
| EP | 2282020 | A1 * | 2/2011 | F01L 1/344 |
| EP | 2282019 | B1 * | 3/2013 | F01L 1/022 |
| EP | 2574745 | A1 * | 4/2013 | F01L 1/344 |
| EP | 2282020 | B1 * | 5/2013 | F01L 1/344 |
| EP | 2574745 | B1 * | 4/2015 | F01L 1/344 |
| EP | 3296529 | A1 * | 3/2018 | F01L 1/047 |
| EP | 3296530 | A1 * | 3/2018 | F01L 1/344 |
| EP | 3296529 | B1 * | 5/2019 | F01L 1/047 |
| EP | 2992200 | B1 * | 7/2019 | F02B 75/047 |
| EP | 3957835 | A1 * | 2/2022 | F16H 35/008 |
| FR | 3090774 | A1 * | 6/2020 | F16D 25/0638 |
| GB | 2224094 | A * | 4/1990 | F01L 1/344 |
| JP | 5238686 | B2 * | 7/2013 | F01B 31/14 |
| JP | 2015145646 | A * | 8/2015 | F02B 75/045 |
| JP | 2015145647 | A * | 8/2015 | F02B 75/045 |
| JP | 2016138467 | A * | 8/2016 | F01B 31/14 |
| JP | 6084334 | B2 * | 2/2017 | F02B 75/047 |
| JP | 2017032070 | A * | 2/2017 | F01B 31/14 |
| JP | 2017150369 | A * | 8/2017 | F02B 75/04 |
| JP | 6208035 | B2 * | 10/2017 | F02B 75/045 |
| JP | 6208589 | B2 * | 10/2017 | F02B 75/045 |
| JP | 2018044500 | A * | 3/2018 | F01L 1/047 |
| JP | 2018044501 | A * | 3/2018 | F01L 1/344 |
| JP | 6384020 | B2 * | 9/2018 | F01B 31/14 |
| JP | 6572664 | B2 * | 9/2019 | F01B 31/14 |
| JP | 2019157759 | A * | 9/2019 | F02B 75/045 |
| JP | 6589686 | B2 * | 10/2019 | F02B 75/04 |
| JP | 2020101118 | A * | 7/2020 | F02B 75/045 |
| JP | 6790639 | B2 * | 11/2020 | F01L 1/047 |
| JP | 6790640 | B2 * | 11/2020 | F01L 1/344 |
| JP | 2022033717 | A * | 3/2022 | F16H 35/008 |
| SE | 522629 | C2 * | 2/2004 | F02D 15/04 |
| WO | WO-0194766 | A1 * | 12/2001 | F02D 15/04 |
| WO | WO-2014179758 | A1 * | 11/2014 | F02B 75/047 |
| WO | WO-2015047420 | A1 * | 4/2015 | F01B 21/02 |
| WO | WO-2015191309 | A1 * | 12/2015 | F01L 1/352 |
| WO | WO-2016121424 | A1 * | 8/2016 | F01B 31/14 |

(56) References Cited

FOREIGN PATENT DOCUMENTS

| WO | WO-2017021369 A1 | * | 2/2017 | ............ F02B 75/04 |
| WO | WO-2017022434 A1 | * | 2/2017 | ............ F01B 31/14 |
| WO | WO-2017145736 A1 | * | 8/2017 | ............ F02B 75/04 |
| WO | WO-2019167591 A1 | * | 9/2019 | ............ F02B 75/045 |
| WO | WO-2019176401 A1 | * | 9/2019 | ............ F02B 75/045 |
| WO | WO-2020129661 A1 | * | 6/2020 | ............ F02B 75/045 |

* cited by examiner

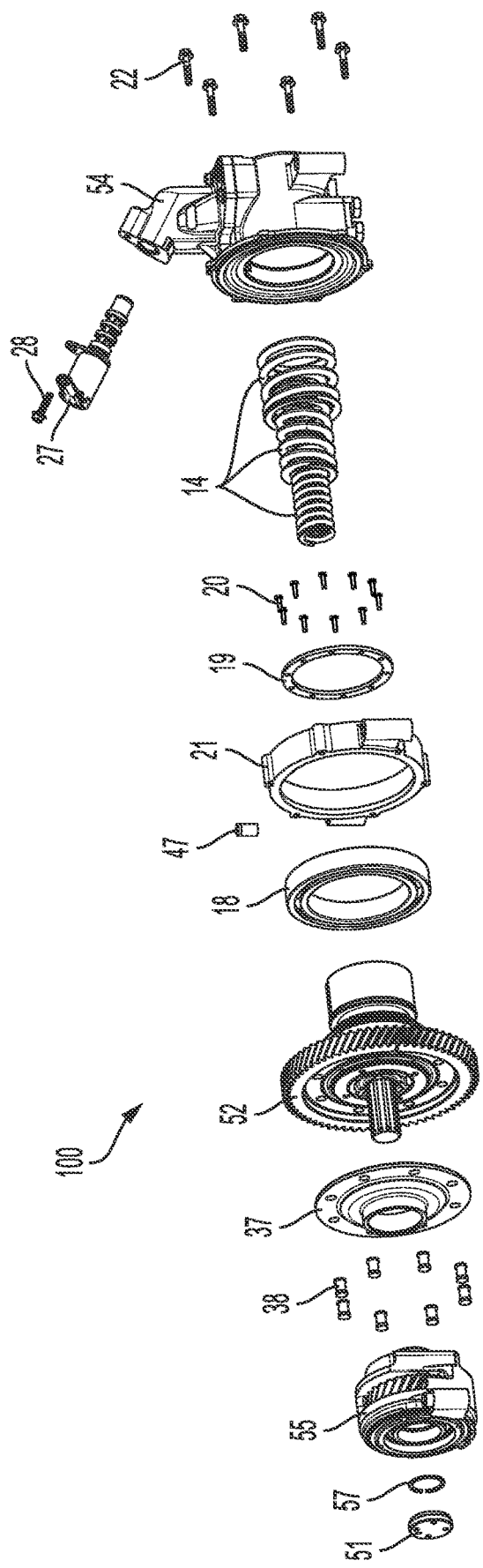

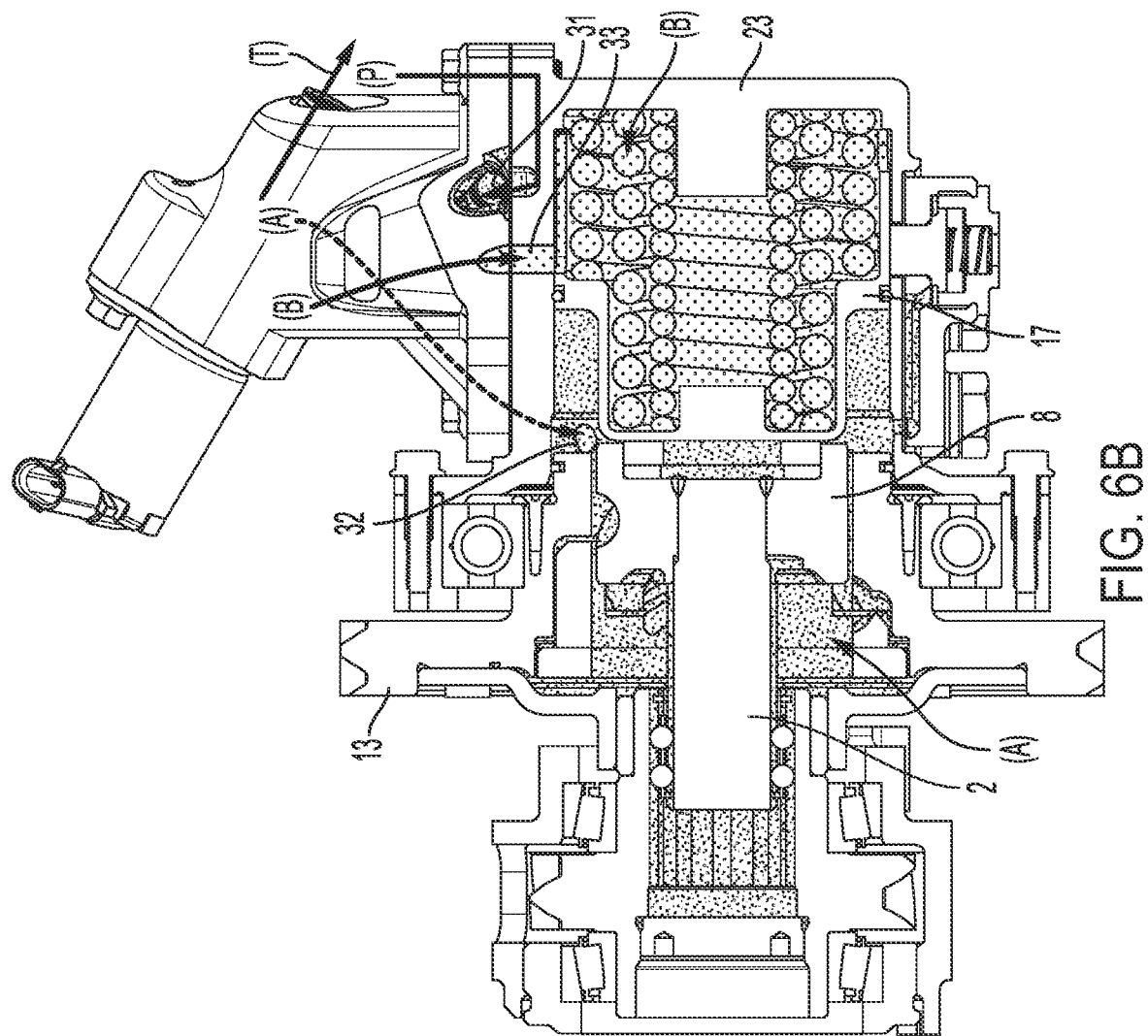

CRANKTRAIN PHASE ADJUSTER FOR VARIABLE COMPRESSION RATIO

INCORPORATION BY REFERENCE

This application claims priority to U.S. Provisional Application No. 63/148,548, which was filed on Feb. 11, 2021, and is incorporated herein by reference in its entirety.

FIELD OF INVENTION

This disclosure is generally related to a cranktrain phase adjuster that can vary a compression ratio of an internal combustion (IC) engine.

BACKGROUND

An IC engine with variable compression ratio (VCR) can achieve greater efficiency and improved fuel consumption than an engine with a fixed compression ratio. Adjusting the compression ratio for an IC engine can be achieved in a variety of ways, but each solution generally has advantages and disadvantages.

An improved system that includes a cost-effective, low profile, and reliable phase adjuster assembly is desired for a cranktrain to implement VCR in an IC engine. It is also desirable to provide a VCR adjuster system that has lower loads and friction and greater control.

SUMMARY

In one aspect, a phase adjuster is provided that is configured to change a phase of an eccentric shaft relative to a crankshaft. The phase adjuster can include an input housing assembly comprising an input gear and an input shaft connected to the input gear via a ball spline. An output gear can be operatively connected to the input shaft via a piston plate mounted on an end of the input shaft. A ramp plate can also be provided. The ball spline can be configured to rotationally lock the input gear to the input shaft while facilitating relative axial movement between the input gear and the input shaft. The output gear, the piston plate, and the ramp ring can each include a spiral bi-directional raceway with balls disposed therebetween to facilitate phasing of the input gear relative to the output gear via axial movement of the piston plate. The piston plate is moved axially by engine torque and assisted by hydraulic pressure from an oil control valve.

In another aspect, the phase adjuster assembly includes an input gear connected to an input shaft via an interface assembly configured to provide axial movement between the input gear and the input shaft, and rotational locking between the input gear and the input shaft. A piston plate is connected to the input shaft, and the piston plate defines at least one inner spiral bidirectional raceway. An output gear is configured to be driven by the input shaft, and the output gear at least partially defines at least one outer spiral bidirectional raceway. At least one first rolling element is arranged between the at least one inner bidirectional raceway and the at least one outer spiral bidirectional raceway. Axial movement of the piston plate adjusts a phase between the input gear and the output gear. The input shaft is configured to be axially displaced via axial movement of the piston plate.

An actuator can be provided that is configured to axially displace the piston plate. In one aspect, a seal plate configured to separate a first chamber and a second chamber. The actuator can include an oil control valve configured to selectively supply oil to the first chamber or the second chamber, and the seal plate is configured to axially displace the piston plate based on pressure levels in the first and second chambers.

A thrust bearing and a thrust washer can be arranged between the piston plate and the seal plate. One of ordinary skill in the art would understand that other intermediate components can be provided between the piston plate and the seal plate.

A spring assembly can be provided that is engaged against the seal plate. The spring assembly can provide an initial biasing force for the seal plate. A ramp ring can be provided that partially defines the at least one outer spiral bidirectional raceway along with the output gear.

In one aspect, the at least one outer spiral bidirectional raceway can be configured to provide two contact points with the at least one first rolling element.

In one aspect, the at least one inner spiral bidirectional raceway can have a larger radius of curvature than a radius of curvature of the at least one first rolling element.

The at least one inner spiral bidirectional raceway can be configured to provide two contact points with the at least one first rolling element.

The phase between the input gear and the output gear can be adjustable by at least 70 degrees, in one aspect. The at least one inner spiral bidirectional raceway and the at least one outer spiral bidirectional raceway can each have an axial length of at least 20 mm. One of ordinary skill in the art would understand that these values can vary.

The at least one inner spiral bidirectional raceway can include a plurality of inner spiral bidirectional raceways, the at least one outer spiral bidirectional raceway can include a plurality of outer spiral bidirectional raceways, and the at least one first rolling element can include a plurality of rolling elements. These multiple raceways and rolling elements can be circumferentially distributed around a periphery of the associated components.

The interface assembly can include a ball-spline interface assembly comprising a cage and at least one second rolling element retained by the cage. The at least one second rolling element can be configured to run on a first axially extending raceway defined on the input shaft and a second axially extending raceway defined on the input gear.

A method of adjusting a phase between an input gear and an output gear is also provided herein. The method includes providing: an input gear connected to an input shaft via an interface assembly configured to provide axial movement between the input gear and the input shaft, and rotational locking between the input gear and the input shaft. The method includes providing a piston plate connected to the input shaft, and the piston plate defines at least one inner spiral bidirectional raceway. The method also includes providing a seal plate arranged adjacent to the piston plate, and an output gear configured to be driven by the input shaft. The output gear at least partially defines at least one outer spiral bidirectional raceway. At least one first rolling element is arranged between the at least one inner bidirectional raceway and the at least one outer spiral bidirectional raceway. The method includes supplying oil to either a first chamber or a second chamber defined on opposite sides of the seal plate such that the seal plate axially displaces the piston plate to adjust the phase between the input gear and the output gear. The method can include more steps, as described herein.

BRIEF DESCRIPTION OF THE DRAWINGS

The foregoing Summary and the following Detailed Description will be better understood when read in conjunction with the appended drawings. In the drawings:

FIG. 3 is an exploded perspective view of the phase adjuster assembly of FIG. 1.

FIG. 6B is a cross-sectional view of the phase adjuster assembly of FIG. 1 that illustrates a second state.

DETAILED DESCRIPTION OF THE PREFERRED EMBODIMENTS

Figure 1:
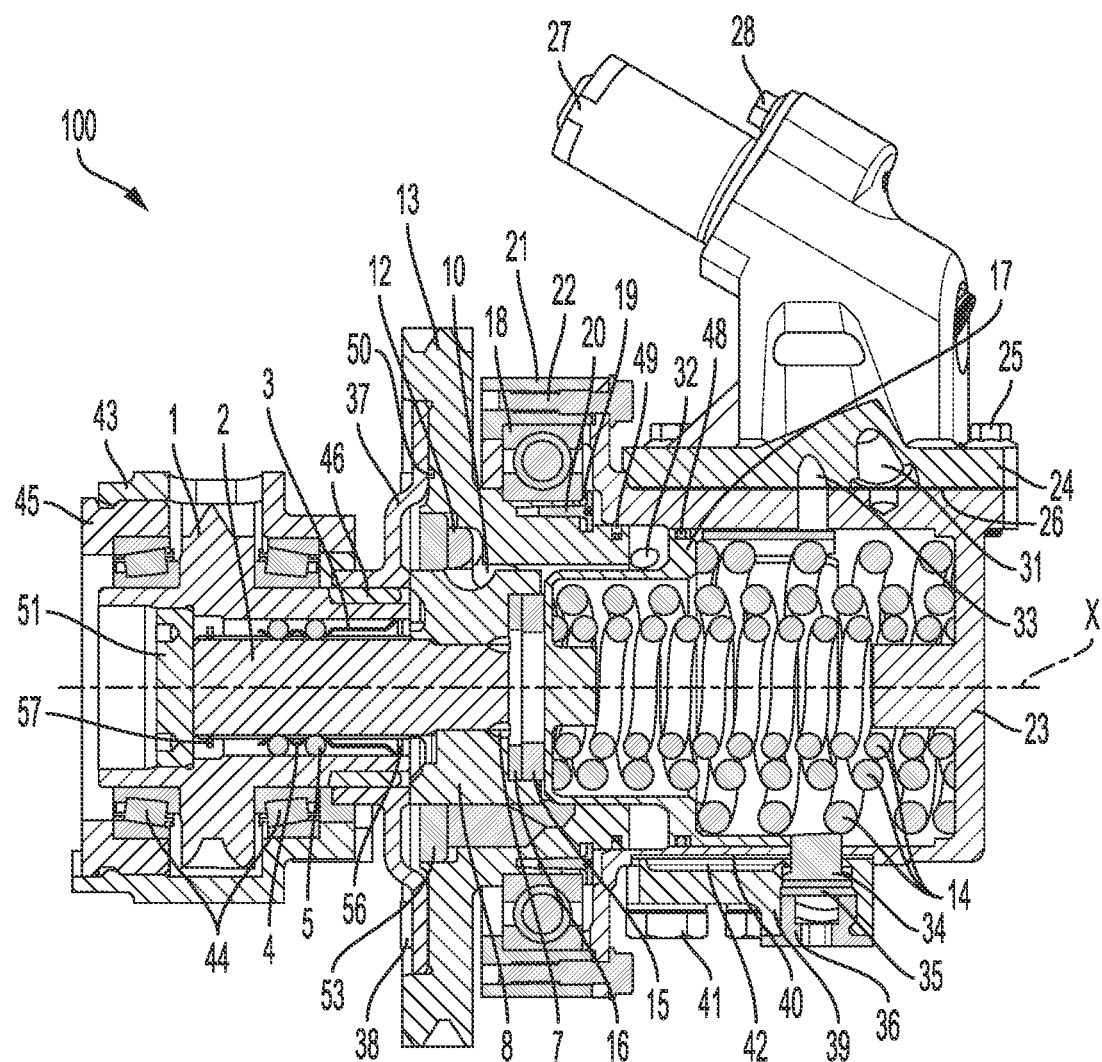
FIG. 1 is a cross-sectional view of a phase adjuster assembly according to one aspect.
Figure 2B:
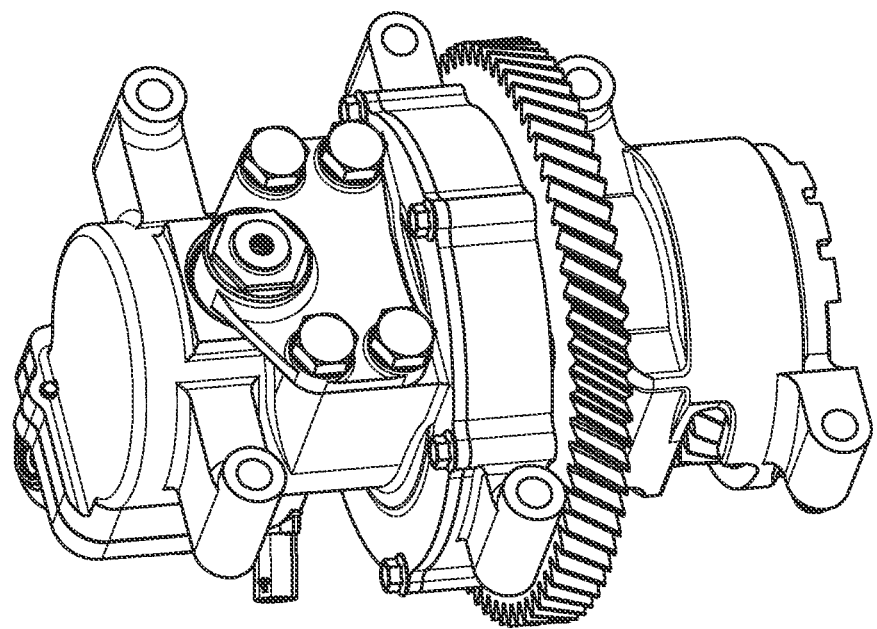
FIGS. 2A and 2B are perspective views of the phase adjuster assembly of FIG. 1.
Figure 2A:
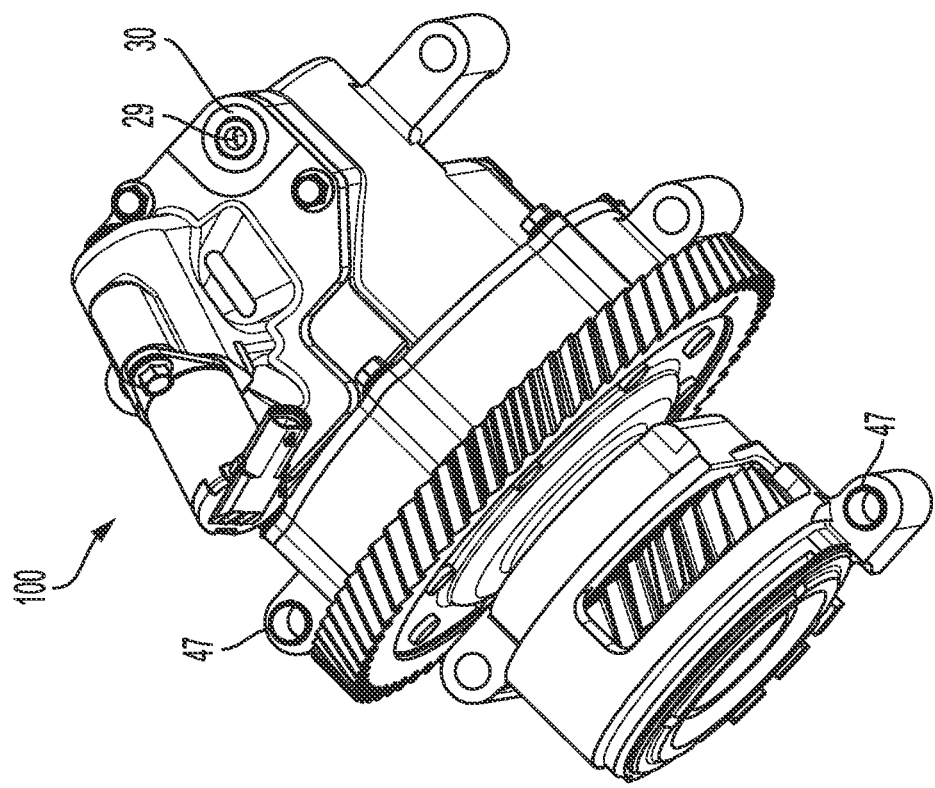

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. This terminology includes the words specifically noted above, derivatives thereof and words of similar import.

Figure 11:
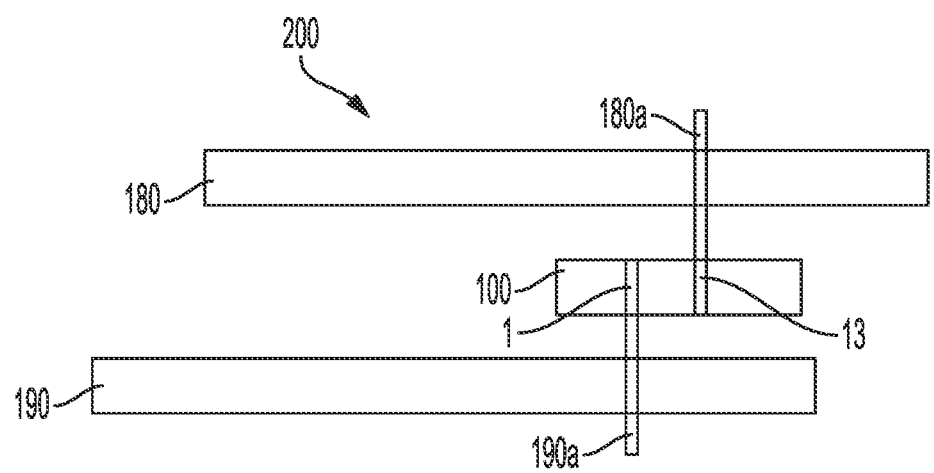
FIG. 11 is a schematic diagram illustrating the phase adjuster relative as implemented in a cranktrain.

FIG. 1 illustrates a phase adjuster assembly 100. Power enters the phase adjuster assembly 100 through an input gear 1 from a prime mover (i.e. an engine eccentric shaft or electric motor). FIG. 11 is a schematic diagram illustrating one aspect in which the phase adjuster 100 can be installed relative to a cranktrain 200, along with a crankshaft 190 and an eccentric shaft 180. The phase adjuster 100 is generally configured to adjust phasing between the crankshaft 190 and the eccentric shaft 180. The phase adjuster 100 can be operatively connected to both the crankshaft 190 and the eccentric shaft 180. One of ordinary skill in the art would understand that this connection or interface between the phase adjuster 100 and the crankshaft 190 and the eccentric shaft 180 can be achieved in a variety of ways. Additionally, the phase adjuster 100 can be arranged between different driving components and driven components. In one aspect, the phase adjuster 100 has a gear train configured to operatively connect the crankshaft 190 to the eccentric shaft 180. The gear train can comprise gears 1, 13, 180a, 190a which are shown in FIG. 11 for illustrative purposes. One of ordinary skill in the art would understand that the ratio and sizing of the gears 1, 13, 180a, 190a can vary.

The input gear 1 can be configured to transmit torque to an input shaft 2 through an interface assembly 3. In one aspect, the interface assembly 3 is a ball-spline interface assembly. The ball-spline interface, which is shown in more detail in FIGS. 7A-7D, can comprise a cage 4 and plurality of rolling elements or balls 5 which run on first and second axially extending raceways 6a, 6b on both the input gear 1 and the input shaft 2. This interface allows the connection to transmit torque while also translating axially with reduced friction.

The input shaft 2 can be connected to a piston plate 8 via a connection or connector 7. In one aspect, the connection 7 is provided via welding. One of ordinary skill in the art would understand that various other connections could be used to rotationally link or lock the input shaft 2 with the piston plate 8.

The piston plate 8 comprises at least one inner spiral bidirectional raceway 9, and can preferably include a plurality of inner spiral bidirectional raceways 9. At least one rolling element or ball 10 is provided that is configured to be arranged along the inner spiral bidirectional raceway 9. The at least one rolling element 10 is configured to contact the inner spiral bidirectional raceway 9 at two points (i.e. one on each side of the raceway). A similar bidirectional outer spiral raceway 11 can be formed by a ramp ring 12 and an output gear 13. The bidirectional outer spiral raceway 11 can also contact the rolling element 10 in two points on its circular spiral surfaces. The shape of the raceways 9, 11 can provide various interfaces with the rolling element 10. For example, the raceways 9, 11 can have a larger radius of curvature than the radius of curvature of the rolling element 10. In one aspect, the shape of the raceways 9, 11 can be provided such that the rolling element 10 has two contact points on a radially outer side and two contact points on a radially inner side. In one aspect, multiple sets of raceways 9, 11 and multiple rolling elements 10 can be provided.

Figure 10C:
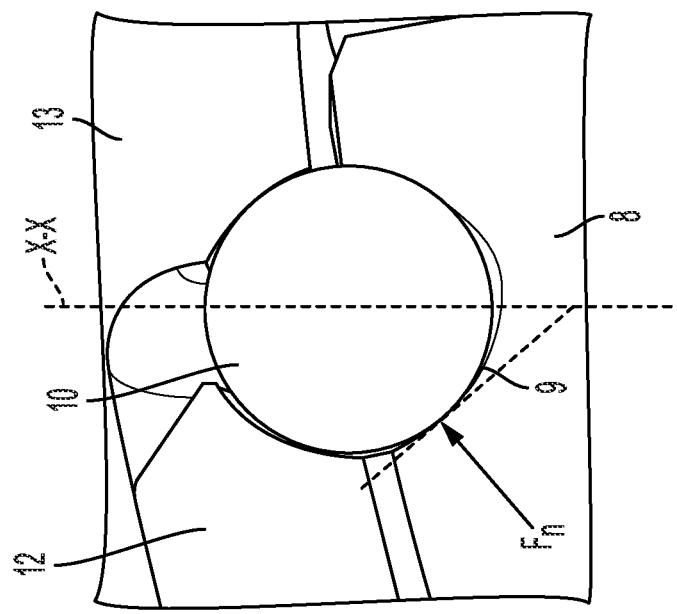
FIG. 10C is a cross-sectional view of the rolling element engaged with the inner spiral bidirectional raceway defined by the piston plate and an outer spiral bidirectional raceway defined by the outer gear and the ramp ring.
Figure 10B:
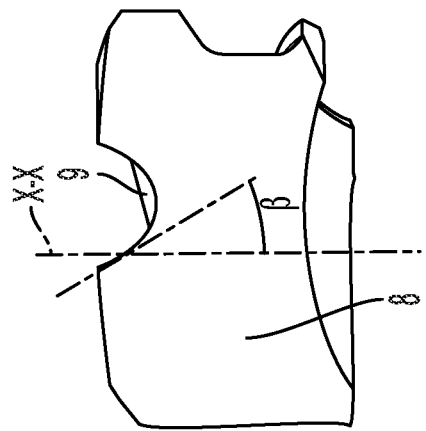
FIG. 10B is a cross-sectional view of the inner spiral bidirectional raceway defined by the piston plate.
Figure 10A:
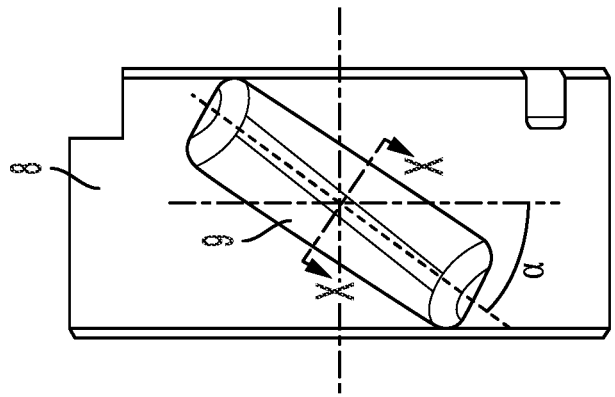
FIG. 10A is a top view of an inner spiral bidirectional raceway defined by the piston plate.

Referring to FIGS. 10A-10C, sectional line X-X of FIG. 10A is normal through the raceway trajectory, and FIGS. 10B and 10C are in the plane of this X-X section view. In one aspect, a contact force (Fn) represents a normal force between the rolling element and the raceway. This force (Fn) defines the contact pressure, and thus fatigue life, in the interface between the rolling element and raceway. In one aspect, the force (Fn) is at least 3 kN, and no greater than 10 kN. One of ordinary skill in the art would understand this value can vary. This force (Fn) can be generated by each rolling element 10. In one aspect, three rolling elements 10 can be provided.

An angle (α) is defined as a lead angle for the helical raceway, which is defined as the raceway angle measured from the transverse axis. This angle (α) defines a primary characteristic of the phasing mechanism, i.e. the axial displacement or travel versus the rotation of the components. A steeper value (i.e. smaller value) for angle (α) decreases the axial displacement or travel for a given rotation. A shallower value (i.e. larger value) for angle (α) increases the axial displacement for a given rotation. Selecting a predetermined angle (α) affects the gain or sensitivity of the phasing device. In addition to affecting the axial stroke, the value of angle (α) also affects the contact stress and the torque to pressure relationship or ratio. A steeper or smaller value for angle (α) results in a higher gain or sensitivity, but reduces the level of control or adjustment. The angle (α) also affects contact stress because a steeper or smaller value for angle (α) results in a larger axial force component and higher contact stresses. Additionally, the angle (α) provides less torque output for a given axial force if a steeper or smaller value for the angle (α) is used. In one aspect, the angle (α) is at least 20 degrees, and no greater than 45 degrees. In one aspect, the angle (α) is at least 10 degrees, and no greater than 60 degrees. One of ordinary skill in the art would understand this value can vary.

In one aspect, as shown in FIG. 10B, an angle (13) is defined as the contact angle of the rolling element against the wall of the respective raceway, measured from the radial axis (i.e. an axis normal to the raceway trajectory that passes through the rotation axis). This particular angle (β) can affect or determine the contact stress. For example, a smaller angle (β) results in reduced contact stress, and is selected to provide a balance relative to stress and machinability, as well as determining the tolerance sensitivity of the rolling element in the raceway. In one aspect, angle (β) is no greater than 45 degrees. One of ordinary skill in the art would understand this value can vary.

Although one set of the specific values are illustrated in FIGS. 10A-10C, one of ordinary skill in the art would understand that a corresponding force (Fn), and angles (α), (β) can be provided for raceways defined for other parts, such as the piston plate 8, output gear 13, and ramp ring 12.

Figure 4:
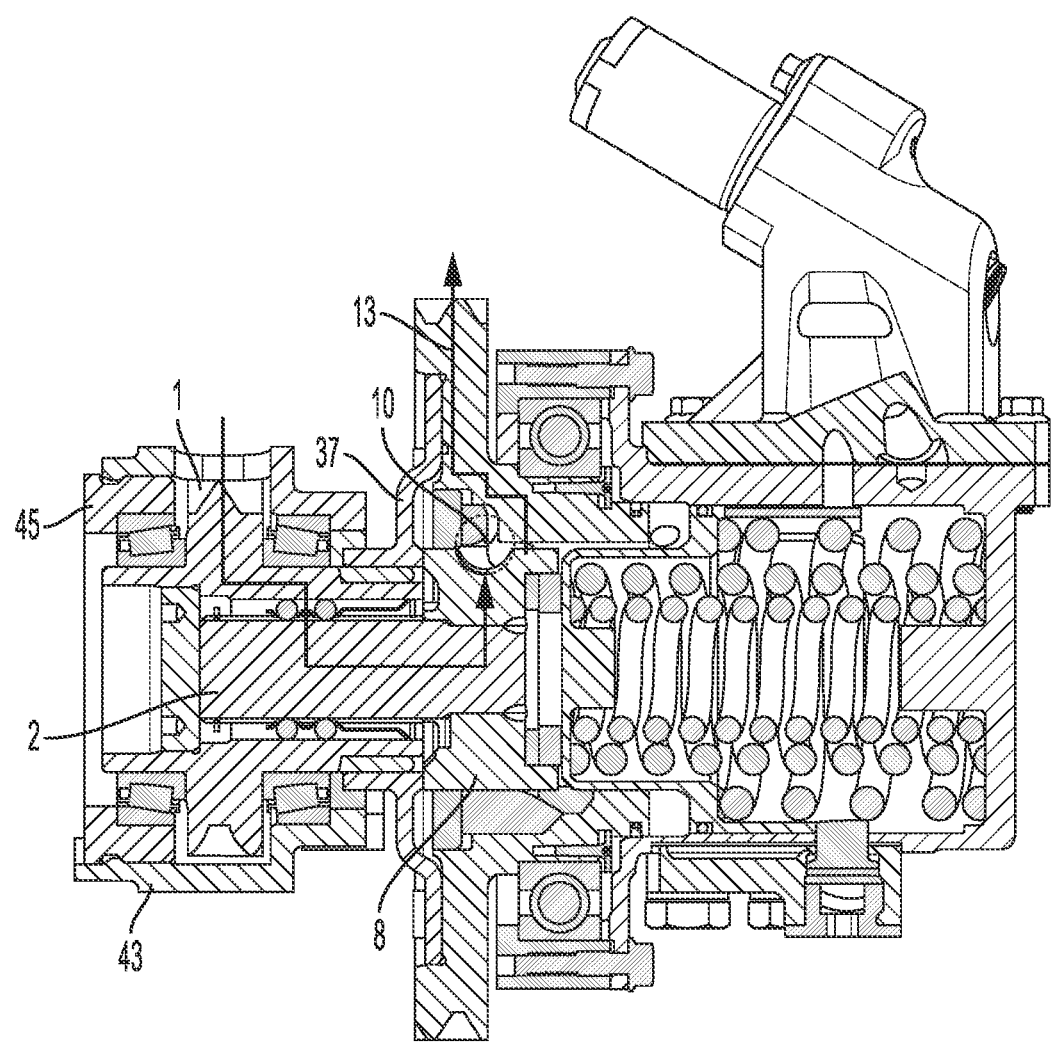
FIG. 4 is a cross-sectional view of the phase adjuster assembly of FIG. 1 that illustrates an exemplary torque path.
Figure 5:
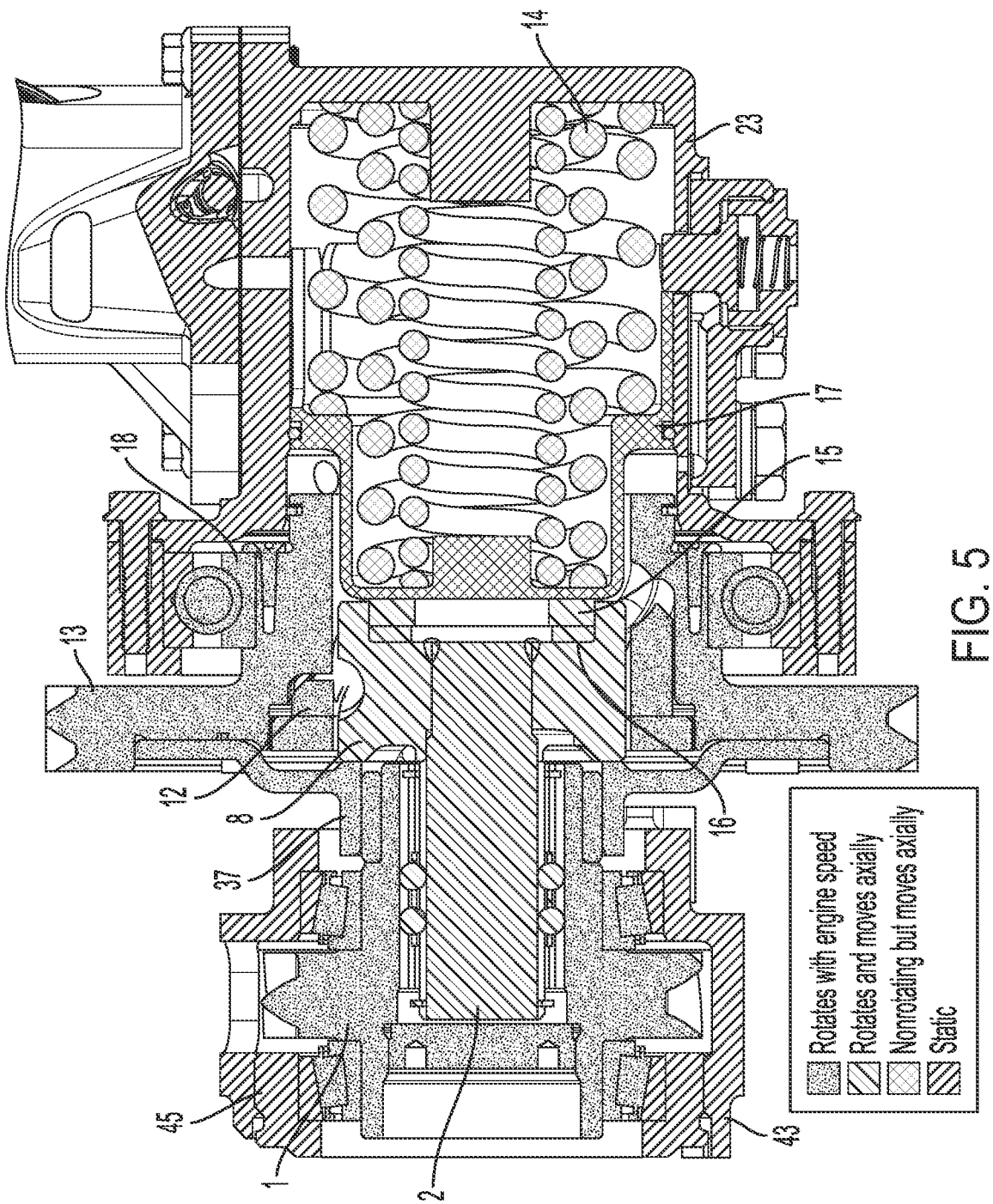
FIG. 5 is a cross-sectional view of the phase adjuster assembly of FIG. 1 that illustrates various movement states or conditions for components within the phase adjuster assembly.

FIGS. 8A, 8B, and 9A-9C illustrate additional details of the ramp and rolling element interfaces. When torque is transmitted from the piston plate 8, to the rolling elements 10, and then to the output gear 13, an axial force component is generated which acts to push the input shaft 2 and the piston plate 8 in an axial direction. In one aspect, the input shaft 2 and the piston plate 8 are pushed axially against a spring assembly 14. The spring assembly 14 can include a series or plurality of springs that are nested within each other, in one aspect. Intermediate components, such as a thrust bearing 15, thrust washer 16, and seal plate 17 can be provided between the spring assembly 14 and the piston plate 8. The thrust bearing 15 can be configured to isolate the seal plate 17 and the spring assembly 14 from the rotation of the components connected to the engine. FIG. 4 illustrates an exemplary torque flow path (shown via a solid line through the relevant components with an arrow end) through the phase adjuster assembly 100 and FIG. 5 illustrates the relative movement state of each of the components of the phase adjuster assembly 100. In FIG. 5, a legend is provided to show varying patterns for each group of components and their relative movement/motion status.

Figure 9A:
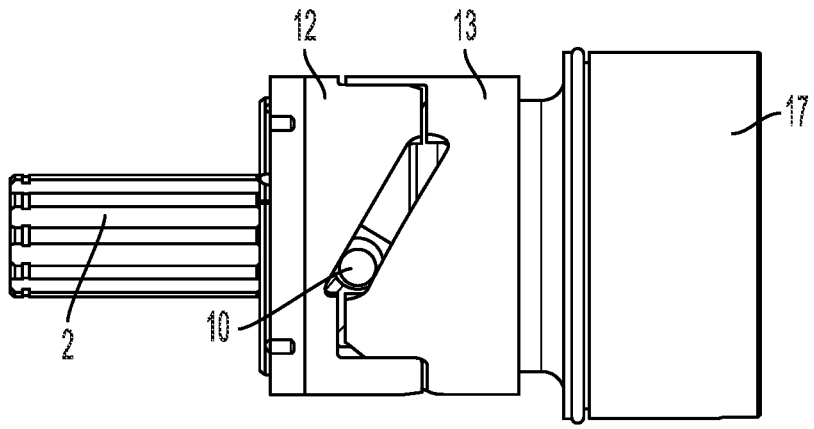
FIG. 9A is a top view showing a rolling element in a first position along a raceway defined by the input shaft, the piston plate, and the ramp ring.
Figure 9B:
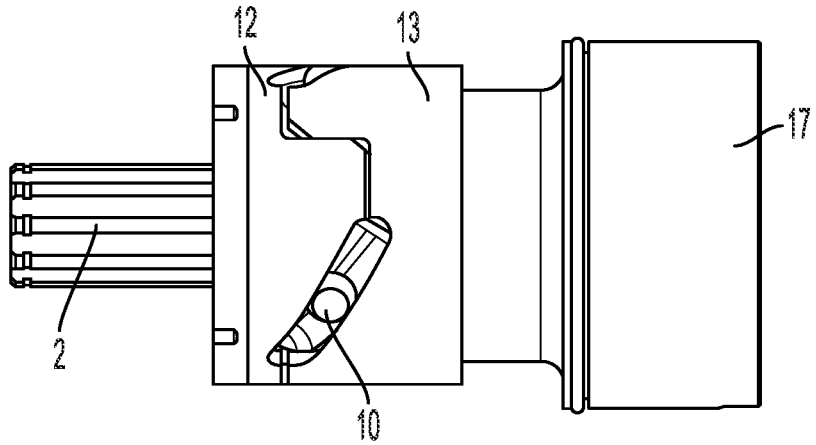
FIG. 9B is a top view showing the rolling element in a second position along the raceway defined by the input shaft, the piston plate, and the ramp ring.
Figure 9C:
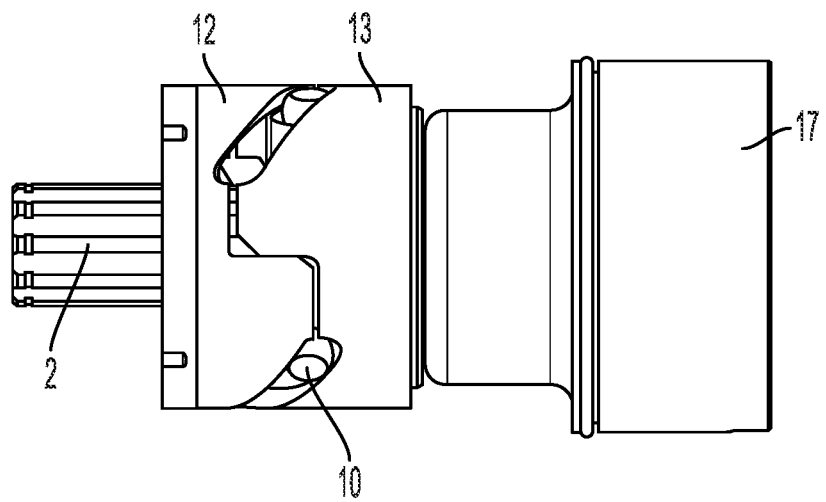
FIG. 9C is a top view showing the rolling element in a third position along the raceway defined by the input shaft, the piston plate, and the ramp ring.

Torque input through the input shaft 2 is transmitted to the output gear 13 through the rolling element contact interfaces on the spiral raceways 9, 11. Because the raceways 9, 11 are helical, the torque causes an axial force component to be developed which is resisted or countered by the spring assembly 14. Once the torque is sufficiently high to overcome the spring preload, the mechanism (i.e. the interface between the input shaft 2 and piston plate 8 will move axially until a new equilibrium point is reached against the spring assembly 14. As the components move axially, the output gear 13 and ramp ring 12 are forced to rotate or phase about their rotational axis relative to the input gear 1 and the input shaft 2. In one aspect, FIGS. 9A, 9B, and 9C illustrate that the outer components must rotate relative to the inner components when the inner components are displaced axially. Thus, for a given torque input, a corresponding rotational output occurs. In one aspect, there can be a linear relationship between these factors. In one aspect, a multi-stage or more complex ramp geometry could be provided such that this relationship is non-linear. Selection of angle (α), and the spring constant or forces of spring assembly 14 can define how the output gear 13 will phase with respect to the input torque. These values can be predetermined based on a particular application's requirements for desired compression ratio across different engine operating points. Besides the torque force, spring force, and output rotation relationship, the disclosed configuration can also rely on hydraulic pressure to prevent travel in an undesired direction. For example, when the force balance would otherwise cause the piston plate 8 to move axially, the hydraulic fluid can be controlled to prevent any motion, or hydraulic pressure can be applied to bias the piston plate 8 to move in either direction. In one aspect, the pressure force either adds or subtracts from the torque-induced axial force thus biasing the equilibrium position of the mechanism in either the advance or retard direction.

As shown in FIG. 5, at least the input gear 1, output gear 13, support plate 37, and inner ring of bearing 18 all rotate with engine speed. The input shaft 2, piston plate 8, thrust bearing 15, and washer 16 all rotate and are configured to be displaced in an axial direction. The seal plate 17 and the spring assembly 14 are configured to move axially and can be configured to be non-rotating. Other components, such as the input gear housing 43, housing nut 45, hydraulic housing 23, etc. can be configured to be stationary.

Regarding the output gear 13, this component can be press fit to a bearing 18, such as a four point contact bearing 18, and retained to the bearing 18 with a retainer plate 19 and at least one first fastener 20. The bearing 18 is also supported on an output gear housing 21, which can be attached or connected via at least one second fastener 22 to a hydraulic housing 23. Other support configurations can be provided for the output gear 13.

The hydraulic housing 23 generally provides an area for installing or attaching an oil control valve (OCV) manifold 24. At least one third fastener 25 can be provided for attaching the OCV manifold 24 on top of a gasket 26. An OCV 27 is then mounted to the OCV manifold 24 with a at least one fourth fastener 28. One of ordinary skill in the art would understand that the hydraulic housing 23 can be arranged in different manners than illustrated in the drawings.

The OCV manifold 24 can provide a hydraulic channel 29 for inlet engine oil pressure to enter the system. In one aspect, an inlet seal 30 can be provided, as shown in FIG.

Figure 6A:
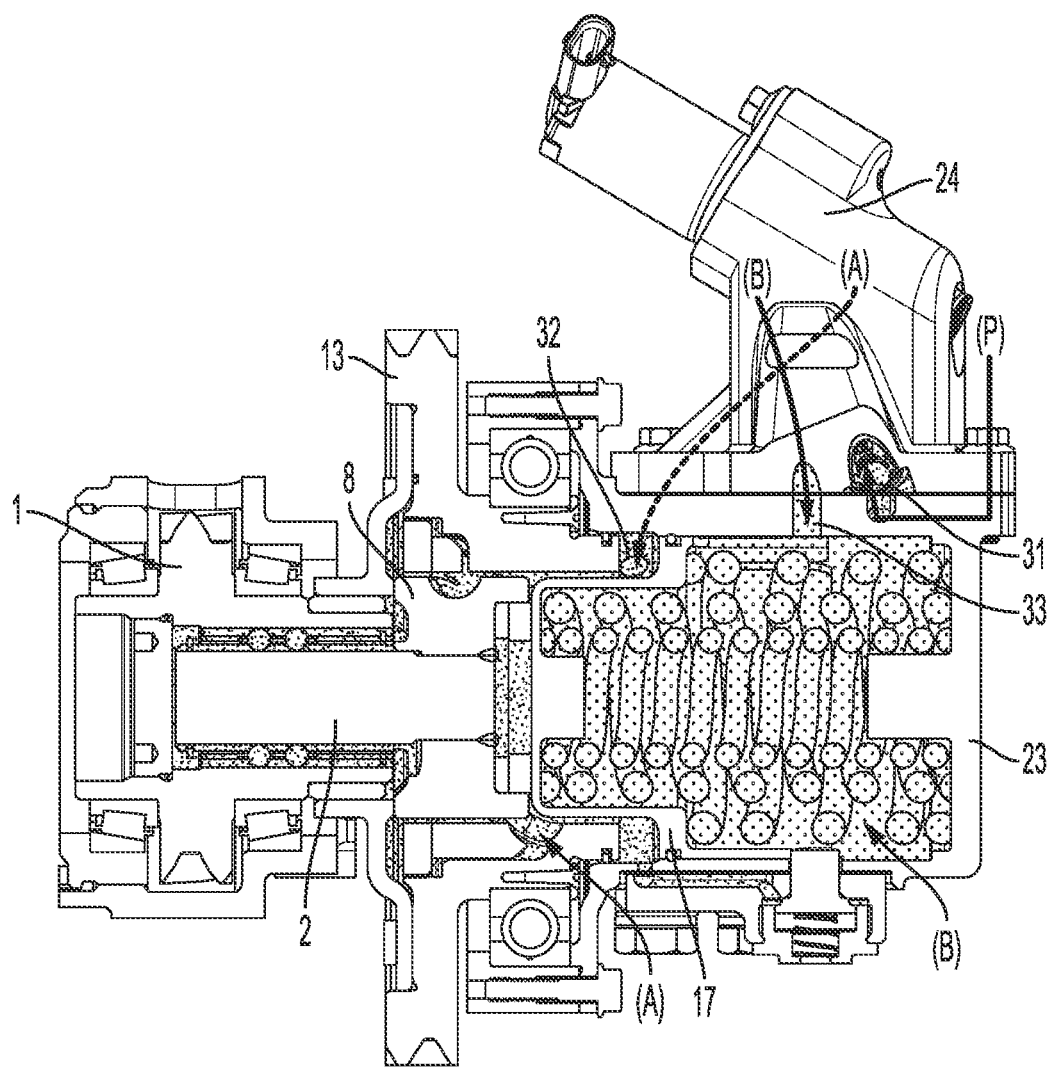
FIG. 6A is a cross-sectional view of the phase adjuster assembly of FIG. 1 that illustrates a first state.
Figure 7A:
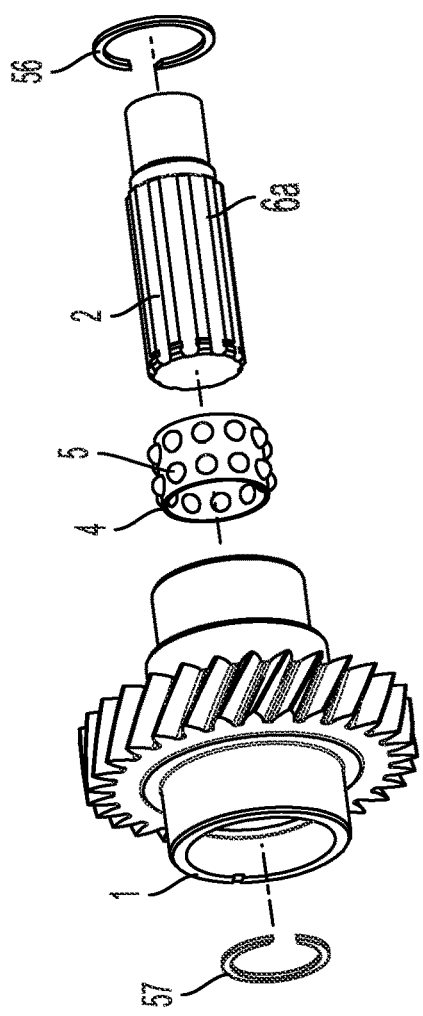
FIG. 7A is an exploded view of an input shaft and input gear and associated components for the phase adjuster assembly.
Figure 7D:
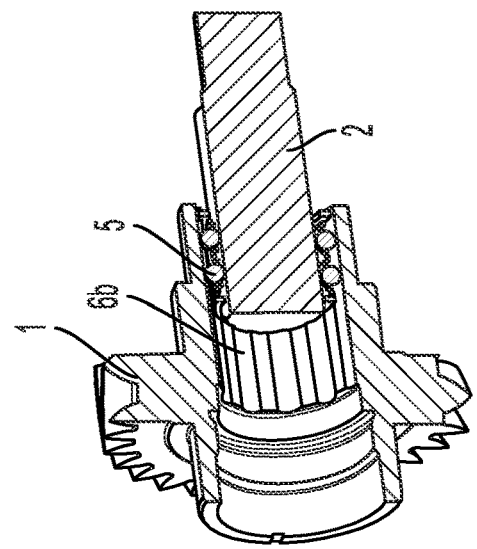
FIG. 7D is a cross-sectional view of the input shaft and input gear in a third state.
Figure 7C:
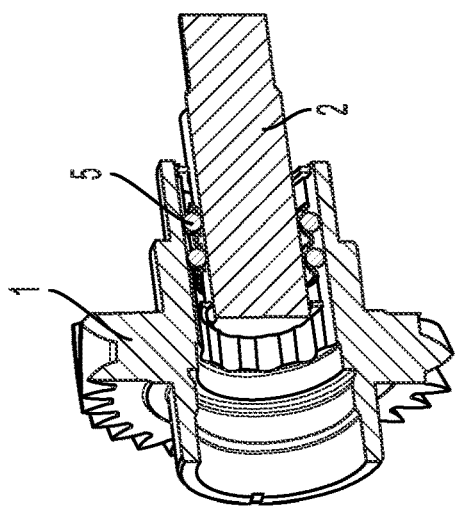
FIG. 7C is a cross-sectional view of the input shaft and input gear in a second state.
Figure 7B:
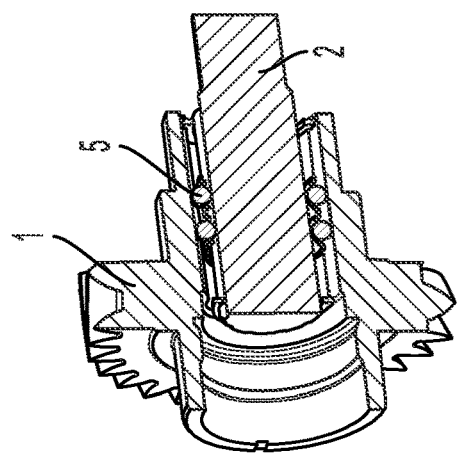
FIG. 7B is a cross-sectional view of the input shaft and input gear in a first state.
Figure 8B:
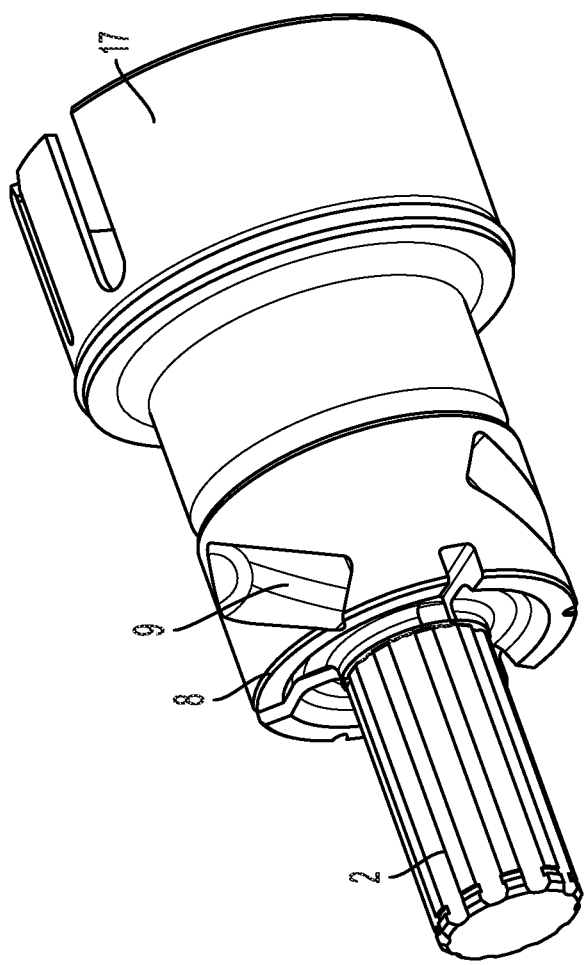
FIG. 8B is a perspective view of the input shaft and a piston plate for the phase adjuster assembly.
Figure 8A:
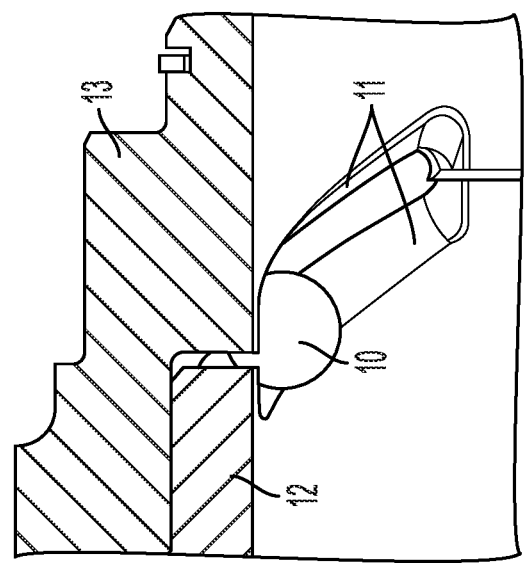
FIG. 8A is a partial cross-sectional view of an output gear and ramp ring for the phase adjuster assembly.

2A. Oil can enter the OCV 27 at a first port 31 (i.e. P-port) and can be further directed to either a second port 32 (i.e. A-port 32) or third port 33 (i.e. B-port 33). The second port 32 is connected to the left-hand side (i.e. with respect to FIG. 1) of the piston plate 8 and the input shaft 2. When oil is provided to the second port 32, a biasing force is generated to assist moving the components axially to the right (i.e. the advance direction). The third port 33 is connected to the right-hand side and provides the same force to the left (i.e. retard direction). FIG. 6A-6C provide a more detailed illustration of the relative flow paths (A, B, P) and chambers (A, B, P) associated with ports 31, 32, 33. As shown in FIGS. 6A and 6B, a chamber (A) is defined on a first axial side of the seal plate 17, and a chamber (B) is defined on a second, opposite axial side of the seal plate 17. The seal plate 17 provides separation between the two chambers A, B. Within the relative chambers, a specific drawing pattern is provided to show the different flows.

In one aspect, the phase adjuster assembly 100 is by default locked in a high compression ratio (CR) position. This initial state can be provided via a locking pin 34 which is biased upward by a locking pin spring 35 against a vented plug 36. One of ordinary skill in the art would understand that the initial state could also be modified to correspond to a low compression ratio position.

While in the high CR position, the piston plate 8 is bottomed out from spring preload against a support plate 37 which is connected to the output gear 13. In one aspect, a fastener, such as at least one fifth fastener 38 can connect the support plate 37 with the output gear 13.

The locking pin 34, the locking pin spring 35, and the plug 36 can be mounted within an axially-sliding pin housing 39 over at least one second gasket 40, and fastened to the hydraulic housing 23, such as via at least one sixth fastener 41. The locking pin 34 can be configured to prevent the seal plate 17 from moving axially, thus keeping the piston plate 8 and input shaft 2 fixed in the default high CR position.

The pin housing 39 can be axially adjustable to ensure the locking pin 34 can be assembled line-to-line with a receptacle hole in the seal plate 17, which reduces the effect of impact load from the engine torque trying to push the inner components in the advance direction. During engine startup, there can be some time when engine torsionals are sent through the parts but hydraulic pressure has not yet been developed or built-up. As a result, there may not be enough pressure or fluid volume within the retard chamber (B) to prevent the mechanism from shaking under these large startup oscillations. To counter this, the locking pin 34 acts as a physical barrier to this startup motion and takes up the axial force generated by the startup torque oscillation. It is desirable to limit the travel stroke or length before the seal plate 17 runs into the locking pin 34, as this lowers the risk of impact surface damage from occurring, as well as limiting NVH effects from a large impact. To counteract this, the pin location is axially adjustable such that regardless of stackup, the locking pin 34 can always start in line-to line contact with the seal plate 17.

To disengage the locking pin 34, pressure from the second port 32 is routed through a passage 42 in the pin housing 39 to push the locking pin 34 downwards until the locking pin 34 releases the seal plate 17. In one aspect, any time the advance chamber (A) is pressurized, then hydraulic fluid can displace move the locking pin 34. As the top of the locking pin 34 is also exposed to the retard chamber (B), it can also be moved when there is pressure in the retard chamber (B). By default, the OCV is configured to pressurize the advance chamber (A) first upon startup, so this flow channel 42 ensures that pressure is supplied to the locking pin 34 as quickly as possible, before the retard chamber (B) can be pressurized.

If a change in compression ratio from high to low (i.e. the advance direction) is desired, the OCV 27 is configured to supply more pressure or fluid to the second port 32 (i.e. the "A chamber") while allowing flow out of the third port 33. The torque force from the input gear 1 is then allowed to push the input shaft 2 and the piston plate 8 in the advance direction against the spring assembly 14.

As the components travel axially, the piston plate 8, the input shaft 2, and the input gear 1 are forced to phase about a rotational axis (X) due to the spiral shape of the raceways 9, 11. This causes the eccentric shaft (i.e. shaft 180) to phase with respect to the crankshaft (i.e. shaft 190) and thus causes a change to a lower CR. Likewise, if a change from low to high (i.e. retard direction) is desired, the A and B port pressure bias is reversed, and the spring assembly 14 forces the components to travel axially back to the high CR position. If a position needs to be held, the OCV 27 can hold a neutral position where flow is prevented in and out of the A and B chambers, thus hydraulically locking the system in a fixed position.

The input gear 1 can be supported to an input gear housing 43 through tapered roller bearings 44, which can be pre-loaded to the input gear housing 43 through a housing nut 45. In addition, a bushing 46 can support and center the input gear 1 to the support plate 37, while allowing the phasing relative motion to occur between the input gear 1 to the support plate 37. The input gear housing 43, the output gear housing 21, and the hydraulic housing 23 can be secured to the engine via a plurality of fasteners and can be positioned on the engine through at least one locating pin 47.

The phase adjuster assembly 100 can include a plurality of seals at various interfaces. For example, an o-ring 48 can be mounted on the seal plate 17 and can be configured to seal the A-chamber from the B-chamber. The o-ring 48 can be configured to slide on the bore of the hydraulic housing 23 while phasing motion is occurring. A first chamber seal 49, i.e. a dynamic seal, can be configured to seal the A-chamber from atmosphere between the output gear 13 and the hydraulic housing 23. A second chamber seal 50, i.e. a static o-ring, can be configured to seal the A-chamber from atmosphere between the output gear 13 and the support plate 37. An input seal plate 51 can be provided that is secured to the input gear 1. In one aspect, the input seal plate 51 can have a threaded connection with the input gear 1. The input seal plate 51 can also seal the A chamber from atmosphere. Various other seals could be provided at interfaces between any one or more of the components described herein, as one of ordinary skill in the art would appreciate.

Various components of the phase adjuster assembly 100 can be considered sub-assemblies. For example, a ball ramp actuator assembly 52 can be provided that comprises the input shaft 2, the piston plate 8, the rolling elements 10, the ramp ring 12, etc. In one aspect, the ball ramp actuator assembly 52 is constructed by welding the input shaft 2 to the piston plate 8, assembling the rolling elements 10 into the inner spiral bidirectional raceway 9 and the bidirectional outer spiral raceway 11, and threading the ramp ring 12 onto the rolling elements 10 with a connector or nut 53. One of ordinary skill in the art would understand that the connector 53 can be omitted and instead a connection can be provided via welding, such as laser welding, or other connection. During assembly, the ball ramp actuator assembly 52 can then be attached to the support plate 37. For example, the ball ramp actuator assembly 52 can be riveted to the support plate 37.

A hydraulic housing assembly 54 can be constructed by assembling the gasket 26, the OCV manifold 24, the OCV 27, the inlet seal 30, and the pin housing 39 together, such as via fasteners or other type of connection. The ball ramp actuator assembly 52, along with seal plate 17 and the output gear housing 21, can be lowered over the thrust bearing 15, the washer 16, and the spring assembly 14 into the hydraulic housing assembly 54 and secured together using a fastener, connector, or other type of connection.

An input gear housing assembly 55 can be constructed by pressing the tapered roller bearings 44 onto the input shaft 2, inserting these components into the input gear housing 43, preloading the bearings 44 with the housing nut 45, then assembling the cage 4 and rolling elements 5 before retaining with a first snap ring 56. Finally, a second snap ring 57 provides retention on the input shaft 2 before the input seal plate 51 is secured to the input gear 1.

In one aspect, the phase between the input gear 1 and the output gear 13 is adjustable by at least 70 degrees. The amount of phasing between the input gear 1 and the output gear 13 can be adjusted by more or less than 70 degrees, as one of ordinary skill in the art would understand based on this disclosure. In one aspect, the at least one inner spiral bidirectional raceway 9 and the at least one outer spiral bidirectional raceway 11 each have an axial length of at least 20 mm. One of ordinary skill in the art would understand that this axial stroke can be larger or smaller.

A method of adjusting a phase between an input gear and an output gear is also provided herein. The method includes providing an input gear 1 connected to an input shaft 2 via an interface assembly 3 configured to provide axial movement between the input gear 1 and the input shaft 2, and rotational locking between the input gear 1 and the input shaft 2. The method also includes providing a piston plate 8 connected to the input shaft 2, and the piston plate 8 defines at least one inner spiral bidirectional raceway 9. The method includes providing a seal plate 17 arranged adjacent to the piston plate 8. An output gear 13 is configured to be driven by the input shaft 2, and the output gear 13 at least partially defines at least one outer spiral bidirectional raceway 11. At least one first rolling element 10 is arranged between the at least one inner bidirectional raceway 9 and the at least one outer spiral bidirectional raceway 11. The method includes supplying oil to either a first chamber or a second chamber defined on opposite sides of the seal plate 17 such that the seal plate 17 axially displaces the piston plate 8 to adjust the phase between the input gear 1 and the output gear 13. Additional method steps can be provided, as one of ordinary skill in the art would understand based on the present disclosure.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LIST OF REFERENCE NUMERALS

Input gear 1
Input shaft 2
Interface assembly 3
Cage 4
Rolling elements 5
First axially extending raceway 6a
Second axially extending raceway 6b
Connection 7
Piston plate 8
Inner spiral bidirectional raceway 9
Rolling elements 10
Outer spiral bidirectional raceway 11
Ramp ring 12
Output gear 13
Spring assembly 14
Thrust bearing 15
Thrust washer 16
Seal plate 17
Bearing 18
Retainer plate 19
At least one first fastener 20
Output gear housing 21
At least one second fastener 22
Hydraulic housing 23
Oil control valve (OCV) manifold 24
At least one third fastener 25
At least one first gasket 26
OCV 27
At least one fourth fastener 28
Hydraulic channel 29
Inlet seal 30
First port 31
Second port 32
Third port 33
Locking pin 34
Locking pin spring 35
Vented plug 36
Support plate 37
At least one fifth fastener 38
Pin housing 39
At least one second gasket 40
At least one sixth fastener 41
Passage 42
Input gear housing 43
Tapered roller bearings 44
Housing nut 45
Bushing 46
At least one locating pin 47
O-ring 48

First chamber seal 49
Second chamber seal 50
Input seal plate 51
Ball ramp actuator assembly 52
Connector 53
Hydraulic housing assembly 54
Input gear housing 55
First snap ring 56
Second snap ring 57
Phase adjuster assembly 100

What is claimed is:

1. A phase adjuster assembly for an internal combustion engine, the phase adjuster assembly comprising:
    an input gear connected to an input shaft via an interface assembly configured to provide axial movement between the input gear and the input shaft, and rotational locking between the input gear and the input shaft;
    a piston plate connected to the input shaft, the piston plate defining at least one inner spiral bidirectional raceway;
    an output gear configured to be driven by the input shaft, the output gear at least partially defining at least one outer spiral bidirectional raceway; and
    at least one first rolling element arranged between the at least one inner bidirectional raceway and the at least one outer spiral bidirectional raceway, wherein axial movement of the piston plate adjusts a phase between the input gear and the output gear.

2. The phase adjuster assembly according to claim 1, further comprising an actuator configured to axially displace the piston plate.

3. The phase adjuster assembly according to claim 2, further comprising a seal plate configured to separate a first chamber and a second chamber, wherein the actuator comprises an oil control valve configured to selectively supply oil to the first chamber or the second chamber, and the seal plate is configured to axially displace the piston plate based on pressure levels in the first and second chambers.

4. The phase adjuster assembly according to claim 3, further comprising a thrust bearing and a thrust washer arranged between the piston plate and the seal plate.

5. The phase adjuster assembly according to claim 3, further comprising a spring assembly engaged against the seal plate.

6. The phase adjuster assembly according to claim 1, further comprising a ramp ring that partially defines the at least one outer spiral bidirectional raceway along with the output gear.

7. The phase adjuster assembly according to claim 6, wherein the at least one outer spiral bidirectional raceway is configured to provide two contact points with the at least one first rolling element.

8. The phase adjuster assembly according to claim 1, wherein the at least one inner spiral bidirectional raceway has a larger radius of curvature than a radius of curvature of the at least one first rolling element.

9. The phase adjuster assembly according to claim 1, wherein the at least one inner spiral bidirectional raceway is configured to provide two contact points with the at least one first rolling element.

10. The phase adjuster assembly according to claim 1, wherein the phase between the input gear and the output gear is adjustable by at least 70 degrees.

11. The phase adjuster assembly according to claim 1, wherein the at least one inner spiral bidirectional raceway includes a plurality of inner spiral bidirectional raceways, the at least one outer spiral bidirectional raceway includes a plurality of outer spiral bidirectional raceways, and the at least one first rolling element includes a plurality of rolling elements.

12. The phase adjuster assembly according to claim 1, wherein the at least one inner spiral bidirectional raceway and the at least one outer spiral bidirectional raceway each have an axial length of at least 20 mm.

13. The phase adjuster assembly according to claim 1, wherein the input shaft is axially displaced via axial movement of the piston plate.

14. The phase adjuster assembly according to claim 1, wherein the interface assembly is a ball-spline interface assembly comprising a cage and at least one second rolling element retained by the cage, and the at least one second rolling element is configured to run on a first axially extending raceway defined on the input shaft and a second axially extending raceway defined on the input gear.

15. A method of adjusting a phase between an input gear and an output gear, the method comprising:
    providing:
        an input gear connected to an input shaft via an interface assembly configured to provide axial movement between the input gear and the input shaft, and rotational locking between the input gear and the input shaft;
        a piston plate connected to the input shaft, the piston plate defining at least one inner spiral bidirectional raceway;
        a seal plate arranged adjacent to the piston plate;
        an output gear configured to be driven by the input shaft, the output gear at least partially defining at least one outer spiral bidirectional raceway; and
        at least one first rolling element arranged between the at least one inner bidirectional raceway and the at least one outer spiral bidirectional raceway; and
    supplying oil to either a first chamber or a second chamber defined on opposite sides of the seal plate such that the seal plate axially displaces the piston plate to adjust the phase between the input gear and the output gear.

16. The method according to claim 15, wherein the at least one outer spiral bidirectional raceway is configured to provide two contact points with the at least one first rolling element, and the at least one inner spiral bidirectional raceway has a larger radius of curvature than a radius of curvature of the at least one first rolling element.

17. The method according to claim 15, wherein the at least one inner spiral bidirectional raceway is configured to provide two contact points with the at least one first rolling element.

18. The method according to claim 15, wherein the phase between the input gear and the output gear is adjustable by at least 70 degrees, and the at least one inner spiral bidirectional raceway and the at least one outer spiral bidirectional raceway each have an axial length of at least 20 mm.

19. The method according to claim 15, wherein the input shaft is axially displaced via axial movement of the piston plate.

20. The method according to claim 15, further comprising a ramp ring that partially defines the at least one outer spiral bidirectional raceway along with the output gear.

* * * * *